(12) United States Patent
Hsieh et al.

(10) Patent No.: US 12,244,840 B2
(45) Date of Patent: Mar. 4, 2025

(54) SEARCHING TECHNIQUES FOR TEMPLATE MATCHING FOR VIDEO CODING

(71) Applicant: QUALCOMM Incorporated, San Diego, CA (US)

(72) Inventors: Cheng-Teh Hsieh, Del Mar, CA (US); Han Huang, San Diego, CA (US); Chun-Chi Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 18/365,854

(22) Filed: Aug. 4, 2023

(65) Prior Publication Data
US 2025/0047884 A1 Feb. 6, 2025

(51) Int. Cl.
| | |
|---|---|
| *H04N 7/12* | (2006.01) |
| *H04N 19/105* | (2014.01) |
| *H04N 19/132* | (2014.01) |
| *H04N 19/176* | (2014.01) |
| *H04N 19/44* | (2014.01) |
| *H04N 19/70* | (2014.01) |
| *H04N 19/127* | (2014.01) |

(52) U.S. Cl.
CPC .......... *H04N 19/44* (2014.11); *H04N 19/105* (2014.11); *H04N 19/132* (2014.11); *H04N 19/176* (2014.11); *H04N 19/70* (2014.11); *H04N 19/127* (2014.11)

(58) Field of Classification Search
CPC .................................................. H04N 19/127
See application file for complete search history.

(56) References Cited

U.S. PATENT DOCUMENTS

| | | |
|---|---|---|
| 2019/0387245 A1 | 12/2019 | Li et al. |
| 2023/0007238 A1 | 1/2023 | Chen et al. |

OTHER PUBLICATIONS

Bross B., et al., "Versatile Video Coding Editorial Refinements on Draft 10", JVET-T2001-v2, 20th JVET Meeting, Oct. 7, 2020-Oct. 16, 2020, Teleconference, (The Joint Video Experts Team of ITU-T SG 16 WP 3 and ISO/IEC JTC 1/SC 29), Nov. 24, 2020, pp. 1-515, XP030293334.

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-101.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

(Continued)

*Primary Examiner* — Young Lee
(74) *Attorney, Agent, or Firm* — Shumaker & Sieffert, PA

(57) ABSTRACT

A video decoder may be configured to receive a block of video data that was encoded using a coding mode that includes a search process in one or more reference frames. The video decoder may prefetch reference samples in a fixed search region of at least one reference frame of the one or more reference frames, and decode the block of video data using the coding mode, including performing the search process for the coding mode using the prefetched reference samples.

26 Claims, 15 Drawing Sheets

(56) References Cited

OTHER PUBLICATIONS

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.

Chen X., et al., "Decoder-Side Motion Vector Refinement Based on Bilateral Template Matching", The Joint Video Exploration Team of ISO/IEC JTC1/SC29/WG11 and ITU-T SG.16, 4. JVET Meeting, Chengdu, Oct. 15, 2016-Oct. 21, 2016, No. JVET-D0029, Oct. 8, 2016, XP030247250, section 2 Proposed decoder-side motion vector refinement, figure 1, pp. 1-4.

Gao H., et al., "Decoder-Side Motion Vector Refinement in VVC: Algorithm and Hardware Implementation Considerations", IEEE Transactions on Circuits and Systems for Video Technology, IEEE, USA, vol. 31, No. 8, Aug. 2021, Nov. 9, 2020, XP011870333, pp. 3197-3211, section III. Decoder-Side Motion Vector Refinement, figure 8.

International Search Report and Written Opinion—PCT/US2024/038015—ISA/EPO—Nov. 6, 2024, p. 13.

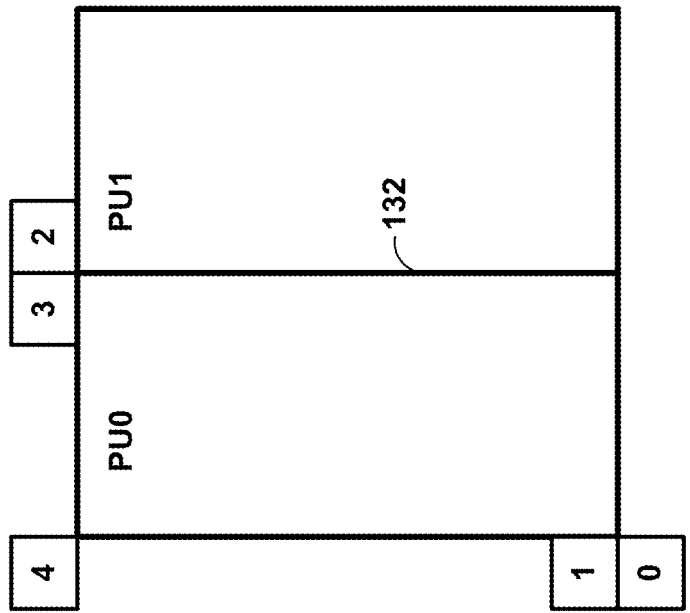
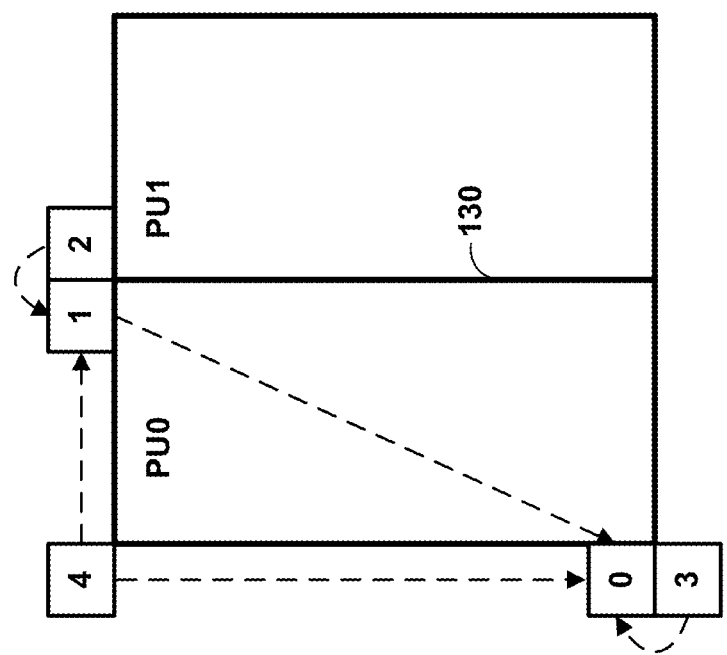
FIG. 2B
FIG. 2A

SEARCHING TECHNIQUES FOR TEMPLATE MATCHING FOR VIDEO CODING

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to decoder-side motion vector derivation (DMVD) techniques (e.g., template matching, bilateral matching, decoder-side MV refinement, bi-directional optical flow). In particular, this disclosure describes techniques for encoding and decoding video data using a DMVD technique that may provide for a faster and more efficient hardware implementation.

As one example, the techniques of this disclosure may include encoding and video data according to a constraint on the allowed search area for DMVD technique. By limiting the search area for a DMVD technique, a video decoder hardware implementation may be configured to prefetch reference samples from the limited search area from an external memory to a local memory. Having the reference pixels prefetched in local memory before decoding begins allows for faster and more efficient decoding, as the fetch process from the external memory may be slow.

The techniques of this disclosure may be applied to any of the existing video codecs, such as ITU-T H.265/HEVC (High Efficiency Video Coding), ITU-T H.266/VVC (Versatile Video Coding), Essential Video Coding (EVC), in future video coding standards, or performed by AOMedia Video 1 (AV1) codecs.

In one example, a method of decoding video data comprises receiving a block of video data that was encoded using a coding mode that includes a search process in one or more reference frames, prefetching reference samples in a fixed search region of at least one reference frame of the one or more reference frames, and decoding the block of video data using the coding mode, including performing the search process for the coding mode using the prefetched reference samples.

In another example, an apparatus configured to decode video data comprises an external memory, a local memory, and one or more processors in communication with the external memory and the local memory. The one or more processors are configured to receive a block of video data that was encoded using a coding mode that includes a search process in one or more reference frames, prefetch reference samples in a fixed search region of at least one reference frame of the one or more reference frames, and decode the block of video data using the coding mode, including performing the search process for the coding mode using the prefetched reference samples.

In another example, this disclosure describes an apparatus configured to decode video data, the apparatus comprising means for receiving a block of video data that was encoded using a coding mode that includes a search process in one or more reference frames, means for prefetching reference samples in a fixed search region of at least one reference frame of the one or more reference frames, and means for decoding the block of video data using the coding mode, including means for performing the search process for the coding mode using the prefetched reference samples.

In another example, this disclosure describes a non-transitory computer-readable storage medium storing instructions that, when executed, cause one or more processors configured to decode video data to receive a block of video data that was encoded using a coding mode that includes a search process in one or more reference frames, prefetch reference samples in a fixed search region of at least one reference frame of the one or more reference frames, and decode the block of video data using the coding mode, including performing the search process for the coding mode using the prefetched reference samples.

The details of one or more examples are set forth in the accompanying drawings and the description below. Other features, objects, and advantages will be apparent from the description, drawings, and claims.

BRIEF DESCRIPTION OF DRAWINGS

FIGS. 2A and 2B are conceptual diagrams illustrating example spatial neighboring motion vector candidates for coding motion vectors in merge mode and advanced motion vector prediction (AMVP) mode.

DETAILED DESCRIPTION

In general, this disclosure describes techniques related to decoder-side motion vector derivation (DMVD) techniques (e.g., template matching, bilateral matching, decoder-side MV refinement, bi-directional optical flow). In particular, this disclosure describes techniques for encoding and decoding video data using a DMVD technique that may provide for a faster and more efficient hardware implementation.

One potential problem with DMVD techniques is that the reference samples used for decoding a particular block are not known until motion vectors from neighboring blocks are decoded. This is because the initial motion vector used in the DMVD technique to decode a current block may be the motion vector from a neighboring block. Because the neighboring blocks motion vector is not known until that block has been decoded, the reference samples used in the search process for the DMVD technique are also not known.

Accordingly, in some examples, a video decoder implementation may wait until the motion vector of the neighbor block is decoded, and the motion vector(s) of the current block are derived, to then fetch reference samples for use in decoding the current block. In particular, the video decoder implementation may fetch reference pixels from an external memory (e.g., DDR RAM) to store in local memory for use in decoding. Fetching pixels from external memory is typically a slow process, that may be limited based on the memory bandwidth. In addition, external memory may experience fetch demands from processing cores other than a video decoder. As such, the time it takes to fetch reference samples for the DMVD process may be exacerbated by other processes executing on a processing system that includes the video decoder.

In view of these drawbacks, the techniques of this disclosure may include encoding and video data according to a constraint on the allowed search area for the DMVD technique. By limiting the search area for a DMVD technique, the range of potential reference samples for the search process is in a fixed search region based on the location of the current block. The fixed search region may be a predetermined or signaled search region that may be determined by a video decoder before decoding a picture. As such, a video decoder hardware implementation may be configured to prefetch reference samples from the fixed search region from an external memory to a local memory. Having the reference samples prefetched in local memory before decoding begins allows for faster and more efficient decoding, as the fetch process from the external memory may be slow.

Figure 1:
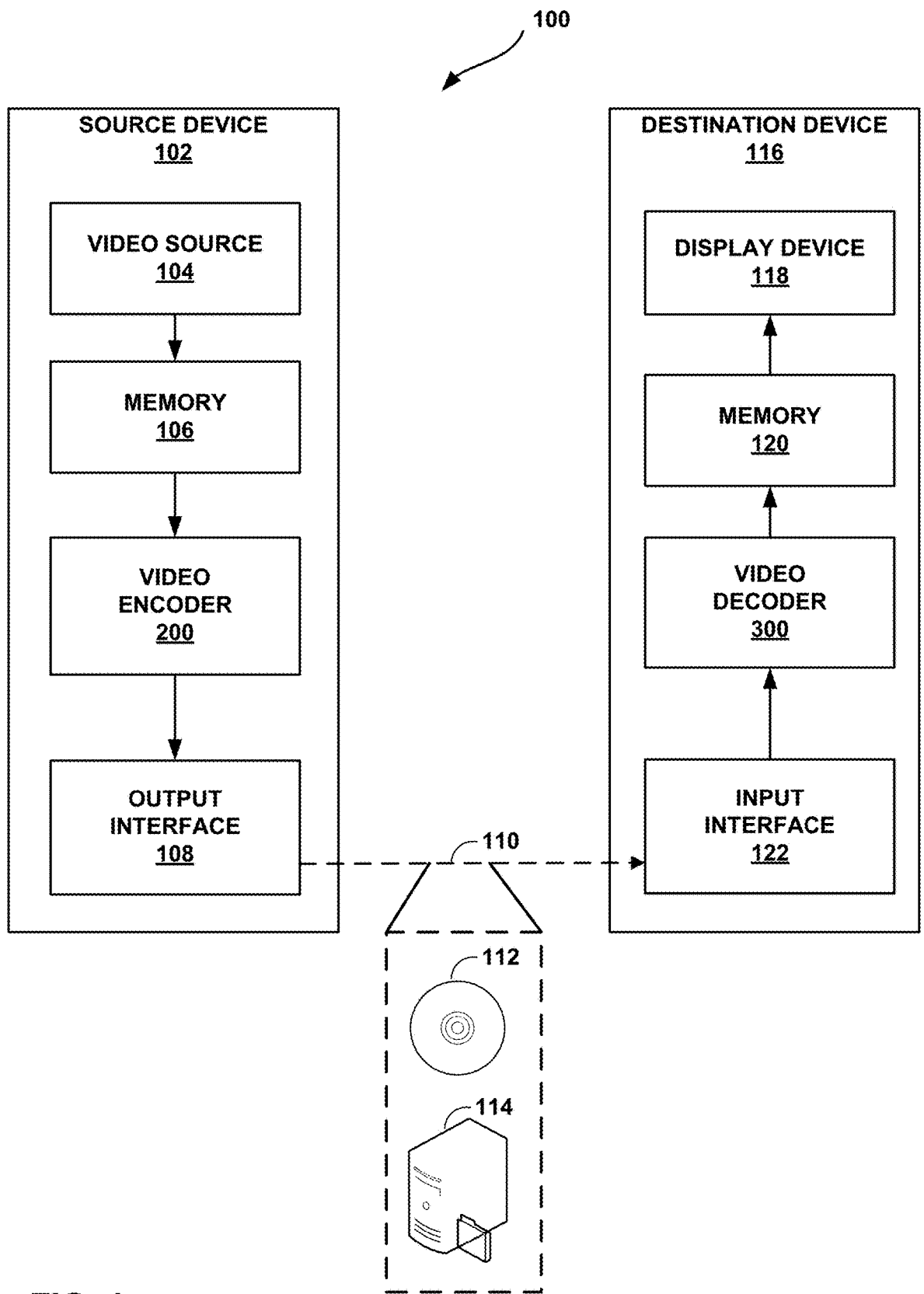
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for pre-fetching reference samples for template matching. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for pre-fetching reference samples for template matching. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that may code video data using template matching techniques.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

In HEVC, the largest coding unit in a slice is called a coding tree block (CTB) or coding tree unit (CTU). A CTB contains a quad-tree the nodes of which are coding units. The size of a CTB can range from 16×16 to 64×64 in the HEVC main profile (although technically 8×8 CTB sizes can be supported). A coding unit (CU) could be the same size of a CTB to as small as 8×8. Each coding unit is coded with one mode, i.e., inter or intra. An inter-coded CU may be further partitioned into 2 or 4 prediction units (PUs) or become just one PU when further partitioning does not apply. When two PUs are present in one CU, the two Pus may be half size rectangles or two rectangle size with ¼ or ¾ size of the CU. When the CU is inter-coded, each PU has one set of motion information, which is derived with a unique inter prediction mode.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU has 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture.

To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As will be explained in more detail below, video encoder 200 and video decoder 300 may be configured to encode and decode video data using a DMVD technique of the disclosure. As one example, video decoder 300 may be configured to receive a block of video data that was encoded using a coding mode that includes a search process in one or more reference frames (e.g., a DMVD technique), prefetch reference samples in a fixed search region of at least one reference frame of the one or more reference frames, and decode the block of video data using the coding mode, including performing the search process for the coding mode using the prefetched reference samples.

FIGS. 2A and 2B are conceptual diagrams illustrating example spatial neighboring motion vector candidates for coding motion vectors in merge mode and advanced motion vector prediction (AMVP) mode. In particular, FIG. 2A depicts spatial neighboring motion vector (MV) candidates to PUO 130 for merge mode, while FIG. 2B depicts spatial neighboring MV candidates to PUO 132 for AMVP mode.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined.

On the other hand, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

According to HEVC, spatial MV candidates are derived from the neighboring blocks shown in FIGS. 2A and 2B, for a specific PU (PUO), although the methods generating the candidates from the blocks differ for merge and AMVP modes. In merge mode, up to four spatial MV candidates can be derived for PUO 130 with the orders shown on FIG. 2A with numbers, and the order is the following: left (0, A1), above (1, B1), above right (2, B0), below left (3, A0), and above left (4, B2).

In AVMP mode, the neighboring blocks are divided into two groups: left group consisting of the block 0 and 1, and above group consisting of the blocks 2, 3, and 4 as shown in FIG. 2B. For each group, the potential candidate in a neighboring block to PUO 132 referring to the same reference picture as that indicated by the signaled reference index has the highest priority to be chosen to form a final candidate of the group. It is possible that not all neighboring blocks contain a motion vector pointing to the same reference picture. Therefore, if such a candidate cannot be found, the first available candidate may be scaled to form the final candidate; thus, the temporal distance differences can be compensated.

Figures 3A, 3B:
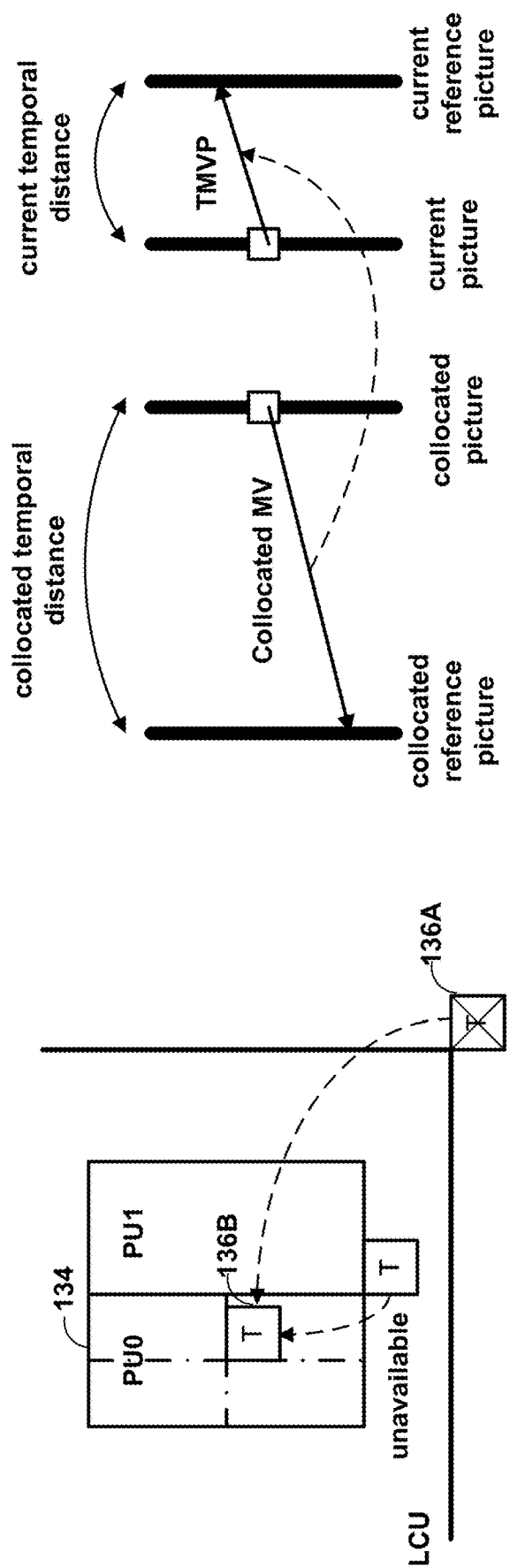
FIGS. 3A and 3B are conceptual diagrams illustrating temporal motion vector prediction techniques.

FIGS. 3A and 3B are conceptual diagrams illustrating temporal motion vector prediction (TMVP) techniques. In particular, FIG. 3A depicts locations of a TMVP candidate for PUO 134, labeled "T," while FIG. 3B depicts motion vector scaling based on temporal distances between pictures.

If TMVP is enabled and a TMVP candidate is available, a video coder may add the TMVP candidate into the MV candidate list after the spatial MV candidates. The process of motion vector derivation for the TMVP candidate is the same for both merge and AMVP modes. However, the target reference index for the TMVP candidate in the merge mode may be set to 0.

The primary block location for TMVP candidate derivation is the bottom right block outside of the collocated PU, as shown in FIG. 3A as a block 136A, to compensate the bias to the above and left blocks used to generate spatial neighboring candidates. However, if block 136A is located outside of the current CTB row or motion information is not available, the TMVP candidate may be substituted with a center block of the PU, block 136B.

Motion vector for TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV need to be scaled to compensate the temporal distance differences, as shown in FIG. 3B.

HEVC includes various other motion vector prediction techniques, e.g., as discussed below.

It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

If a motion vector candidate list is not complete, artificial motion vector candidates may be generated and inserted at the end of the list until the list is full with candidates. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Candidates from different blocks may happen to be the same, which decreases the efficiency of a merge/AMVP candidate list. A video coder may apply a pruning process to solve this problem. Using the pruning process, the video coder may compare one candidate against the others in the current candidate list to avoid inserting identical candidate in certain extent. To reduce the complexity, only a limited number of pruning process iterations may be applied, instead of comparing each potential one with all the other existing ones.

Figure 4:
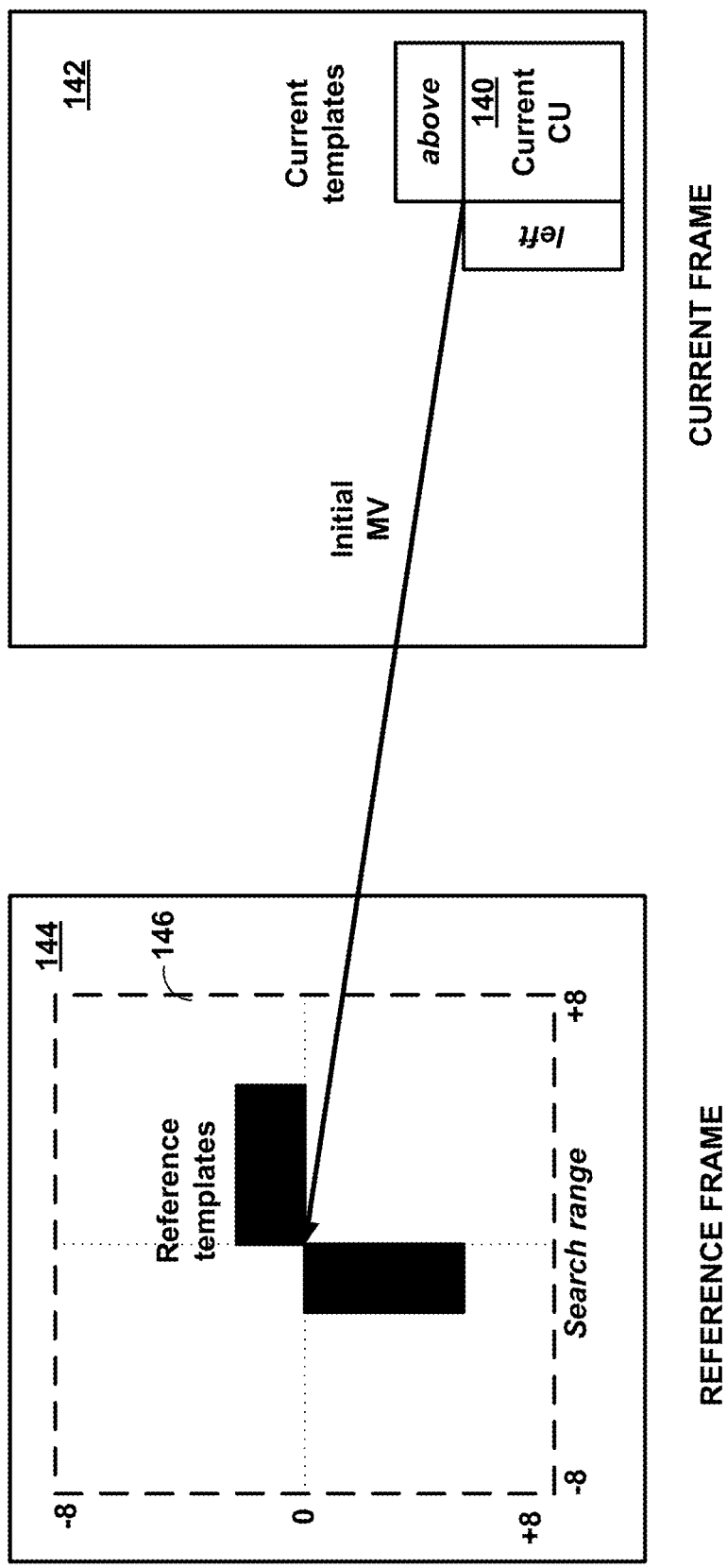
FIG. 4 is a conceptual diagram illustrating template matching prediction for motion vector coding.

FIG. 4 is a conceptual diagram illustrating template matching (TM) prediction for motion vector coding. Template matching (TM) prediction is a special merge mode based on Frame-Rate Up Conversion (FRUC) techniques. With this mode, motion information of a current block (such as current CU 140) is not signalled but derived at decoder side (e.g., by video decoder 300). Video encoder 200 may also perform these techniques during motion compensation. TM may be applied to both AMVP mode and regular merge mode. In AMVP mode, MVP candidate selection is determined based on template matching to pick up the initial motion vector (MV) which reaches the minimal difference between current block template and reference block template. In regular merge mode, a TM mode flag is signalled to indicate the use of TM and then TM is applied to the merge candidate indicated by merge index for MV refinement. That is, the motion vector associated with the merge candidate is used as the initial MV.

As shown in FIG. 4, template matching may be used to derive motion information of current CU 140 by finding the closest match between a template (top and/or left neighboring blocks of the current CU) in current picture 142 and a block (same size to the template) in reference picture 144. With an AMVP candidate selected based on initial matching error (e.g., the initial MV), its MVP is refined by template matching within search area 146. With a merge candidate indicated by a signaled merge index, its merged MVs corresponding to L0 and L1 are refined independently by template matching and then the less accurate one is further refined again with the better one as a prior.

When a motion vector points to a fractional sample position, motion compensated interpolation is performed. To reduce complexity, bi-linear interpolation instead of regular 8-tap DCT-IF interpolation may be used for both template matching to generate templates on reference pictures. The matching cost C of template matching may be calculated as follows:

$$C = SAD + w \cdot (|MV_x - MV_x^s| + |MV_y - MV_y^s|) \quad (1)$$

In formula (1) above, w is a weighting factor which may be set to 4 (e.g., based on empirical testing), MV and $MV^s$ indicate the currently tested MV and the initial MV (i.e., a MVP candidate in AMVP mode or merged motion in merge mode), respectively. Sum of absolute difference (SAD) may be used as the matching cost of template matching.

When TM is used, motion may be refined using luma samples only. The derived motion may be used for both luma and chroma for MC inter prediction. After the MV is determined, a final MC may be performed using an 8-tap interpolation filter for luma and a 4-tap interpolation filter for chroma.

MV refinement is a pattern-based MV search with the criterion of template matching cost and a hierarchical structure. In some examples, two search patterns may be supported: a diamond search and a cross search for MV refinement. The hierarchical structure specifies an iterative process to refine MV, starting at a coarse MVD precision (e.g., quarter-pel) and ending at a fine one (e.g., ⅛-pel). The MV may be directly searched at quarter luma sample MVD precision with diamond pattern, followed by quarter luma sample MVD precision with cross pattern, and then this is followed by one-eighth luma sample MVD refinement with cross pattern. Search range 146 of MV refinement may be set equal to (−8, +8) luma samples around the initial MV. When the current block is of bi-prediction, both MVs are refined independently, and then the best of which (in terms of matching cost) is set as a prior to further refine the other MV with BCW (bi-prediction with CU level weights) weight values.

Figure 5:
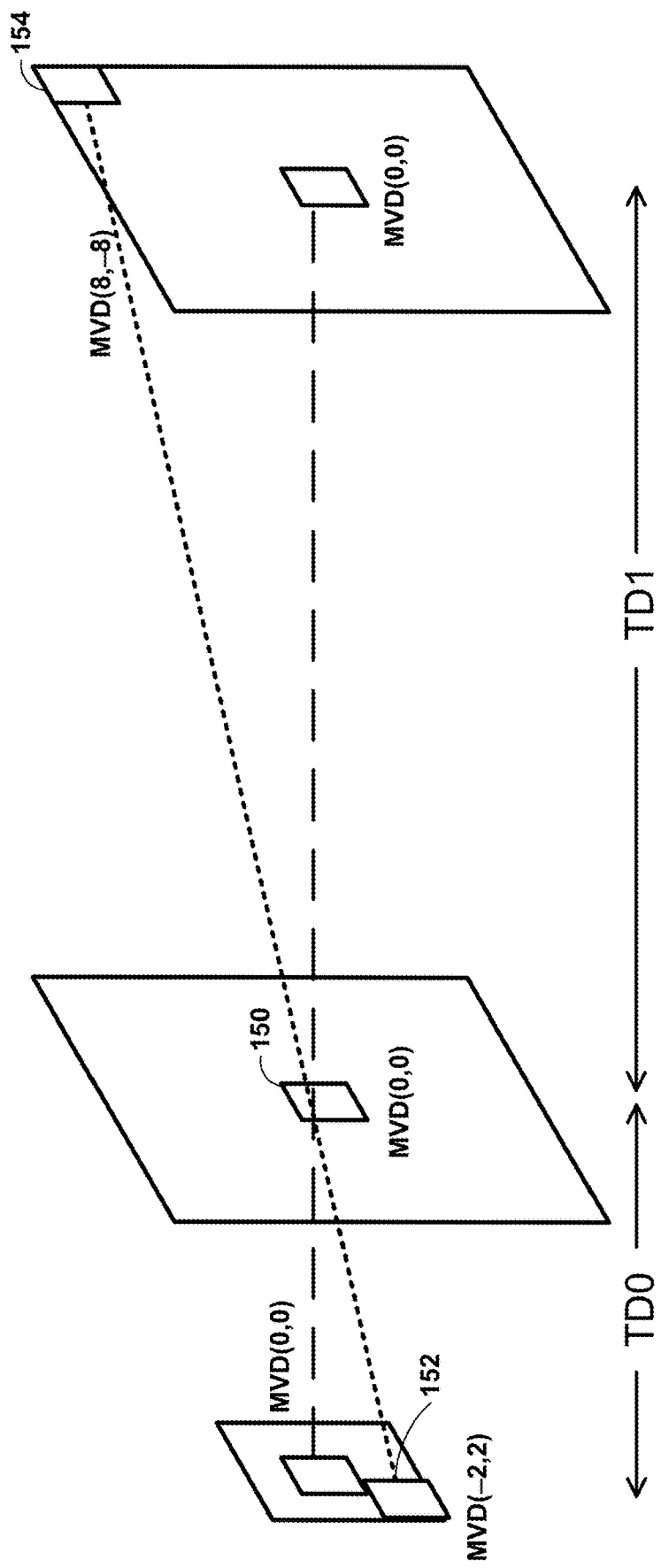
FIG. 5 is a conceptual diagram illustrating motion vector difference (MVD) values for blocks in reference pictures having different temporal distances (TDs) to a current picture including a current block.

FIG. 5 is a conceptual diagram illustrating motion vector difference (MVD) values for blocks in reference pictures having different temporal distances (TDs) to a current picture including current block 150. Bilateral Matching (a.k.a., Bilateral Merge or BM) prediction is another merge mode based on Frame-Rate Up Conversion (FRUC) techniques. When a video coder (such as video encoder 200 or video decoder 300) determines to apply the BM mode, the video coder may derive two initial motion vectors MV0 and MV1. The video coder may code a merge candidate index representing the merge candidate in a constructed merge list. The video coder may perform a Bilateral Matching search around MV0 and MV1. The video coder may derive the final MV0' and MV1' based on the minimum Bilateral Matching cost.

The motion vector difference MVD0 (denoted by MV0'-MV0) and MVD1 (denoted by MV1'-MV1) pointing to reference blocks 152, 154 may be proportional to the temporal distances (TD), e.g., TD0 and TD1, between the current picture and the two reference pictures. The temporal distances may represent differences between picture order count (POC) values for the respective pictures. FIG. 5 shows an example of MVD0 and MVD1, where TD1 is 4 times that of TD0.

Figure 6:
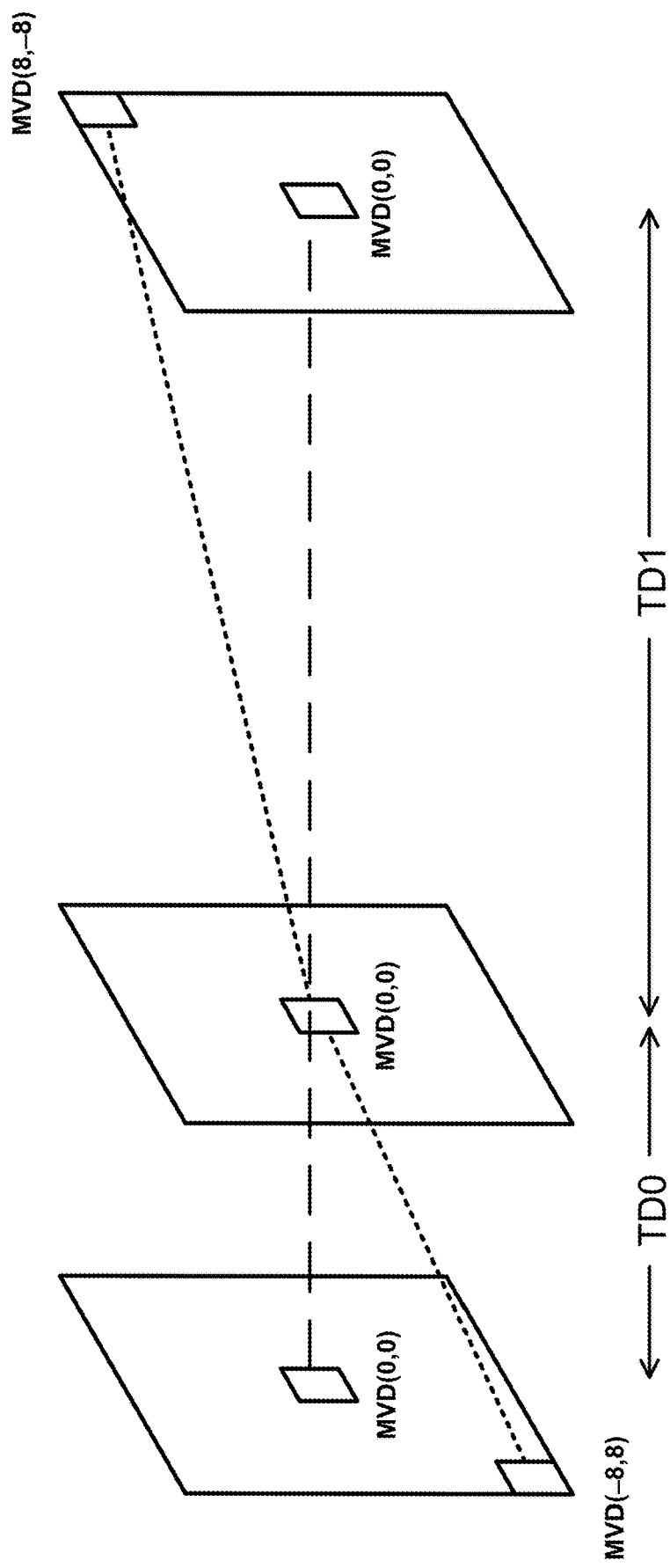
FIG. 6 is a conceptual diagram illustrating an example in which two MVDs are mirrored regardless of temporal distances.

FIG. 6 is a conceptual diagram illustrating an example in which two MVDs are mirrored regardless of temporal distances. FIG. 6 depicts another possible design in which MVD0 and MVD1 are mirrored regardless of the values of TD0 and TD1. In the example of FIG. 6, MVD0 and MVD1 are mirrored, where the value of TD1 is 4 times that of TD0.

Figure 7:
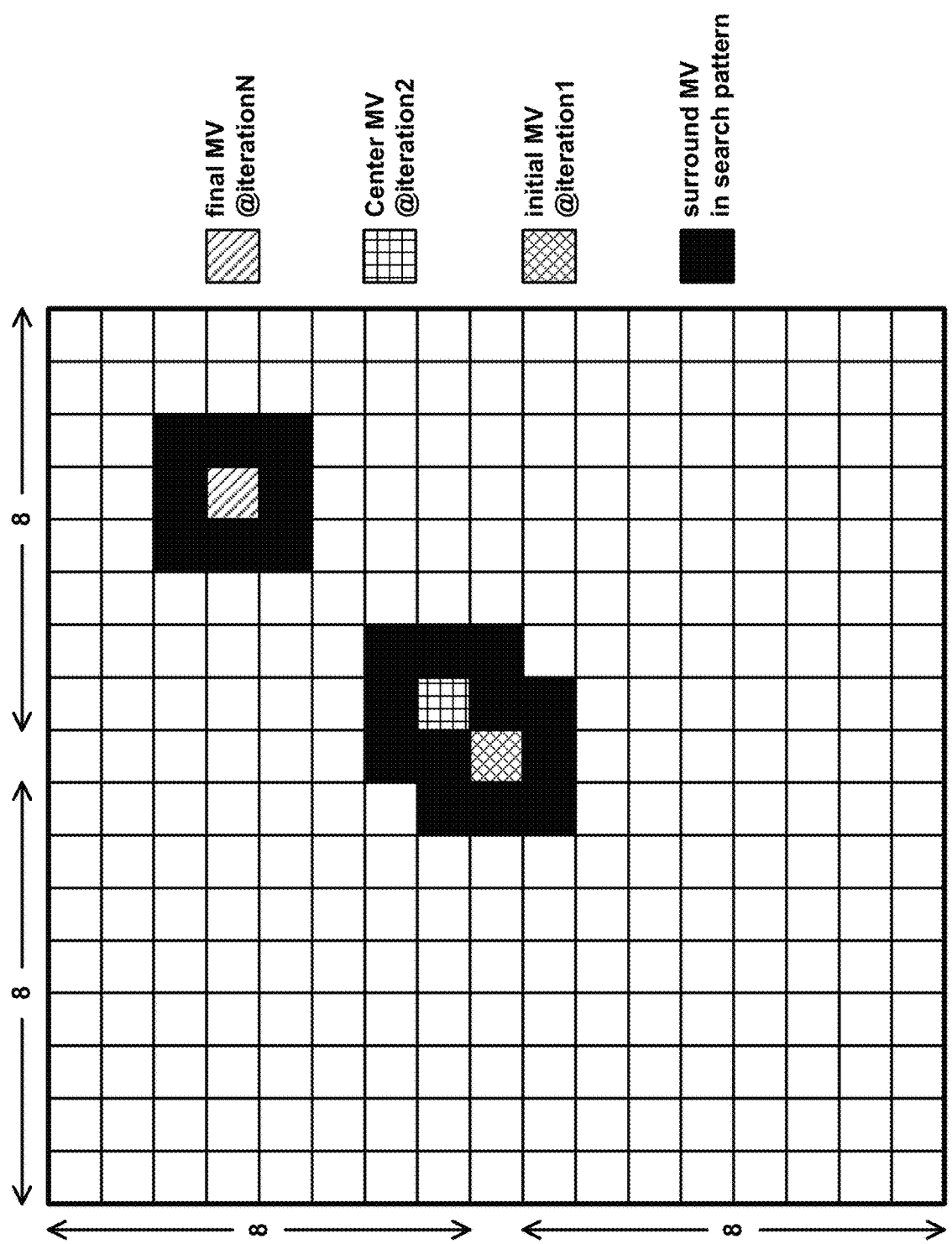
FIG. 7 is conceptual diagram illustrating an example of a 3×3 square search pattern in a bilateral matching search range.

FIG. 7 is conceptual diagram illustrating an example of a 3×3 square search pattern in a bilateral matching search range. According to bilateral matching, a video coder (such as video encoder 200 and video decoder 300) may perform a local search around the initial MV0 and MV1 to derive the final MV0' and MV1'. The video coder may apply the local search to a 3×3 square search pattern and loop through the search range [−8, 8]. In each search iteration, the video coder may calculate the bilateral matching cost of the eight surrounding MVs in the search pattern and compare these costs to the bilateral matching cost of the center MV. The MV which has minimum bilateral matching cost becomes the new center MV in the next search iteration. The video coder may terminate the local search when the current center MV has a minimum cost within the 3×3 square search pattern or the local search reaches the pre-defined maximum search iteration. FIG. 7 shows an example of the 3×3 square search pattern in the search range [−8, 8].

Figure 8:
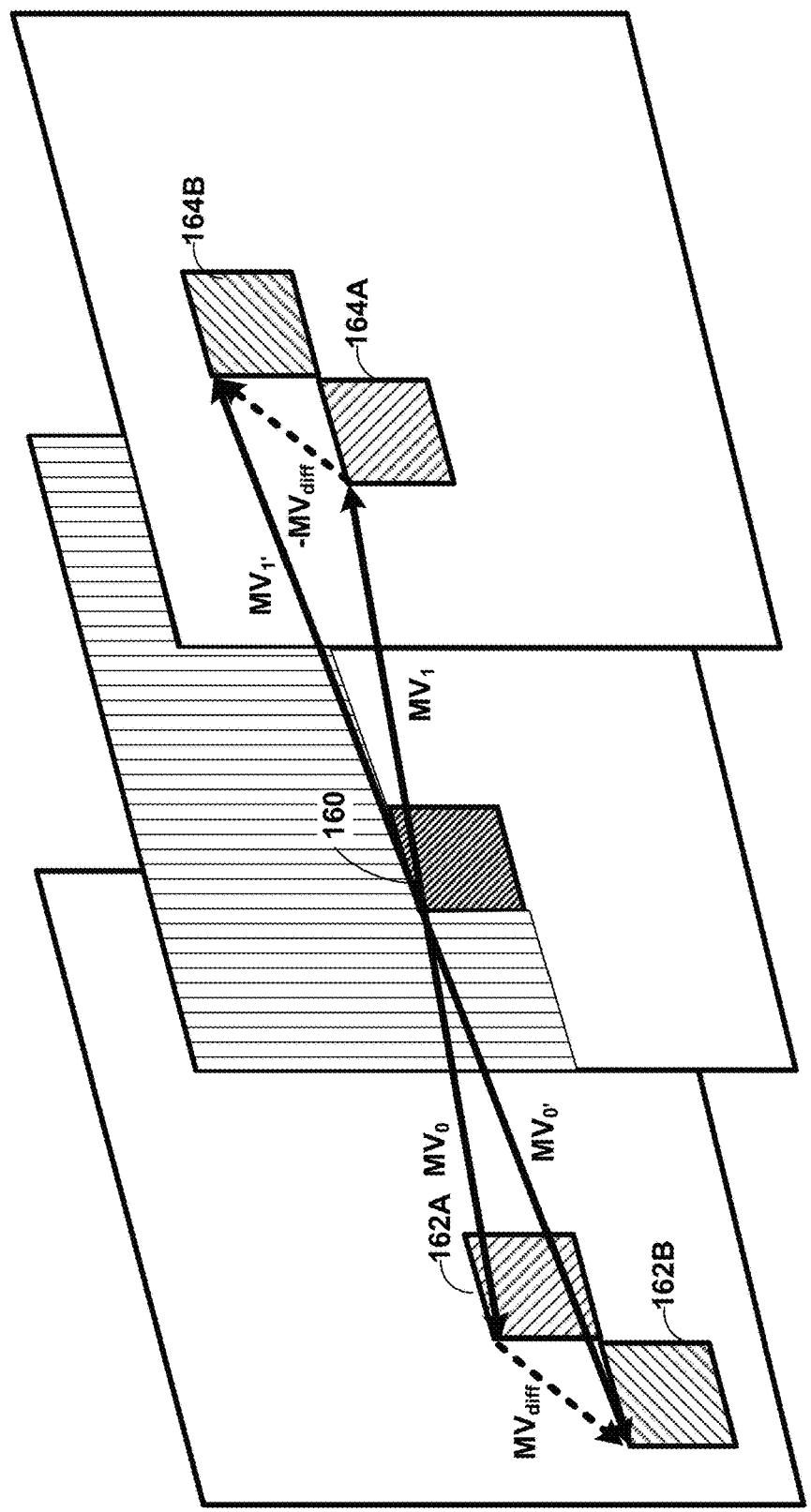
FIG. 8 is a conceptual diagram illustrating an example of refining a motion vector using decoder-side motion vector refinement (DMVR).

FIG. 8 is a conceptual diagram illustrating an example of refining a motion vector using decoder-side motion vector refinement (DMVR) for current block 160. To increase the accuracy of the MVs of the merge mode, a decoder side motion vector refinement (DMVR) is applied in VVC. Both video encoder 200 and video decoder 300 may perform the DMVR process. In bi-prediction operation, a refined MV is searched around initial MVs in the reference picture list L0 and reference picture list L1. The video coder, according to the DMVR technique, calculates the distortion between two candidate blocks 162A, 164A in the reference picture list L0 and list L1. As illustrated in FIG. 8, the SAD between candidate blocks 162B, 164B based on each MV candidate around the initial MV is calculated. The MV candidates 162B, 164B with the lowest SAD becomes the refined MV and used to generate the bi-predicted signal.

The refined MV derived by DMVR process is used to generate the inter prediction samples and also used in temporal motion vector prediction for future pictures coding. While the original MV is used in deblocking process and also used in spatial motion vector prediction for future CU coding. DMVR is a subblock-based merge mode with a pre-defined maximum processing unit of 16×16 luma samples. When the width and/or height of a CU are larger than 16 luma samples, the CU may be further split into subblocks with width and/or height equal to 16 luma samples.

In one example of DMVR, the search points are surrounding the initial MV and the MV offset obey the MV difference mirroring rule. In other words, any points that are checked by DMVR, denoted by candidate MV pair (MV0, MV1) obey the following two equations:

$$MV0'=MV0+MV\_offset$$

$$MV1'=MV1-MV\_offset$$

In the equations above, MV_offset represents the refinement offset between the initial MV and the refined MV in one of the reference pictures. The refinement search range is two integer luma samples from the initial MV. The searching includes the integer sample offset search stage and fractional sample refinement stage.

A video coder may perform a 25 points full search for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E_{x,y}=A(x-x_{min})^2+B(y-y_{min})^2+C$$

where ($x_{min}$, $y_{min}$) corresponds to the fractional position with the least cost and C corresponds to the minimum cost value. Solving the above equations using the cost value of the five search points, the ($x_{min}$, $y_{min}$) may be computed as:

$$x_{min}=(E_{-1,0}-E_{1,0})/2(E_{-1,0}+E_{1,0}-2E_{0,0})$$

$$y_{min}=(E_{0,-1}-E_{0,1})/2(E_{0,-1}+E_{0,1}-2E_{0,0})$$

The value of $x_{min}$ and $y_{min}$ may be automatically constrained to be between −8 and 8, since all cost values are positive and the smallest value is E(0, 0). This corresponds to half pixel (pel) offset with 1/16th-pel MV accuracy in VVC. The computed fractional ($x_{min}$, $y_{min}$) are added to the integer distance refinement MV to get the sub-pixel accurate refinement delta MV.

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, may be padded from those available samples.

In VVC, DMVR is enabled if the following conditions are all satisfied:
  CU level merge mode with bi-prediction MV
  One reference picture is in the past and another reference picture is in the future with respect to the current picture
  The distances (i.e., POC difference) from both reference pictures to the current picture are same
  CU has more than 64 luma samples
  Both CU height and CU width are larger than or equal to 8 luma samples
  BCW weight index indicates equal weight
  Weighted Prediction (WP) is not enabled for the current block
  Combined Inter-Intra Prediction (CIIP) mode is not used for the current block As described above, hardware implementation issues relating the fetching of reference samples may occur when coding video data using the decoder-side motion vector derivation (DMVD) methods discussed above (e.g., TM, BM, DMVR). In particular, DMVD coding techniques may result in two major hardware implementation issues: spatial motion vector propagation and neighboring reconstruction sample access.

Spatial motion vector propagation with refinement vector information to subsequent blocks for spatial motion vector prediction is a critical hardware implementation burden for many DMVD methods. Motion field reconstruction, reference sample fetching and motion compensation (e.g., operations that include accessing reference samples, such as interpolation process and DMVD methods) are usually separated in different pipeline stages and the first two may be performed in several cycles (or a few CTUs) ahead of motion compensation to better ensure reference samples are ready on chip for interpolation. Since the refinement vector information is unknown during the first two stages, all three can only be done sequentially which breaks the pipeline design and increase decoding latency.

One work-around solution is to fetch more reference samples to cover all possible reference samples that may be used during motion compensation. However, due to spatial motion vector prediction (e.g., the use of motion vectors from neighboring blocks), the refinement motion information may carry over to subsequent blocks and accumulates spatially, resulting in an indeterminable size of reference samples to be fetched from reference pictures. As a result, such a solution is not functionally different from fetching all samples from reference pictures, which would require increasing the on-chip memory buffer size to store all reference samples. Another work-around solution is to stop propagating refinement vector information to subsequent blocks in the current picture, at the risk of significantly lowering motion prediction efficiency and potentially increasing distortion.

Accessing neighboring reconstruction samples for template matching to generate a current block template also incurs longer latency in decoding. Without template matching, inter blocks can be reconstructed independently regardless of neighboring block reconstruction (unlike intra block which has to wait for neighboring block reconstruction to perform intra prediction). However, template matching includes accessing neighboring reconstructed samples, which implies that a certain inter-dependency is introduced to current block and neighboring block reconstruction in inter prediction, resulting in increase of decoding latency.

In summary, a potential problem with DMVD techniques, including template matching, is that the reference samples used for decoding a particular block are not known until motion vectors from neighboring blocks are decoded. This is because the initial motion vector used in the DMVD technique to decode a current block may be the motion vector from a neighboring block. Because the neighboring blocks motion vector is not known until that block has been decoded, the reference samples used in the search process for the DMVD technique are also not known. This may mean that the corresponding reference samples used from the DMVD technique may not be loaded locally and timely. This potential unavailability of reference samples may cause hardware pipeline processing stalls until the latest reference pixels are fetched from external memory. Therefore, the uncertainty in the timing of fetching reference samples causes a serious dependency issue which could be a critical path for video coder hardware design.

In view of these drawbacks, the techniques of this disclosure may include encoding and video data according to a constraint on the allowed search area for the DMVD technique. In particular, the search area for a DMVD processes may be limited to a fixed search region. By limiting the search area for a DMVD technique to a fixed search region, the range of potential reference samples for the search process is known based on the location of the current block. As such, a video decoder hardware implementation of video decoder 300 may be configured to prefetch reference samples from the fixed search region from an external memory to a local memory before decoding the current block. Having the reference samples prefetched in local memory before decoding begins for the current blocks allows for faster and more efficient decoding, as the fetch process from the external memory may be slow.

Video encoder 200 and video decoder 300 of FIG. 1 and of FIGS. 9 and 10 below may be configured to perform techniques of this disclosure. In one example, video encoder 200 may be configured to encode a block of video data using a DMVD technique. Or more generally, video encoder 200 may be configured to encode using a coding mode that includes a search process in one or more reference frames. Such a coding mode may include template matching, bilateral matching prediction, decoder-side motion vector refinement, or any other coding mode that may use a neighbor motion vector and/or a search area in a reference picture. Video encoder 200 may be configured to encode the current block using a fixed search region. In some examples, encoding the current block using a fixed search region may disallow the use of particular initial motion vectors from neighboring blocks in the situation where the motion vector from such a neighboring block points outside of the fixed search region.

In a reciprocal fashion, video decoder 300 may be configured to receive a block of video data that was encoded using a coding mode that includes a search process in one or more reference frames. Because a fixed search region was used by video encoder 200, video decoder 300 may prefetch reference samples in the fixed search region of at least one reference frame of the one or more reference frames. Video decoder 300 may then decode the block of video data using the coding mode, including performing the search process for the coding mode using the prefetched reference samples.

Figure 9:
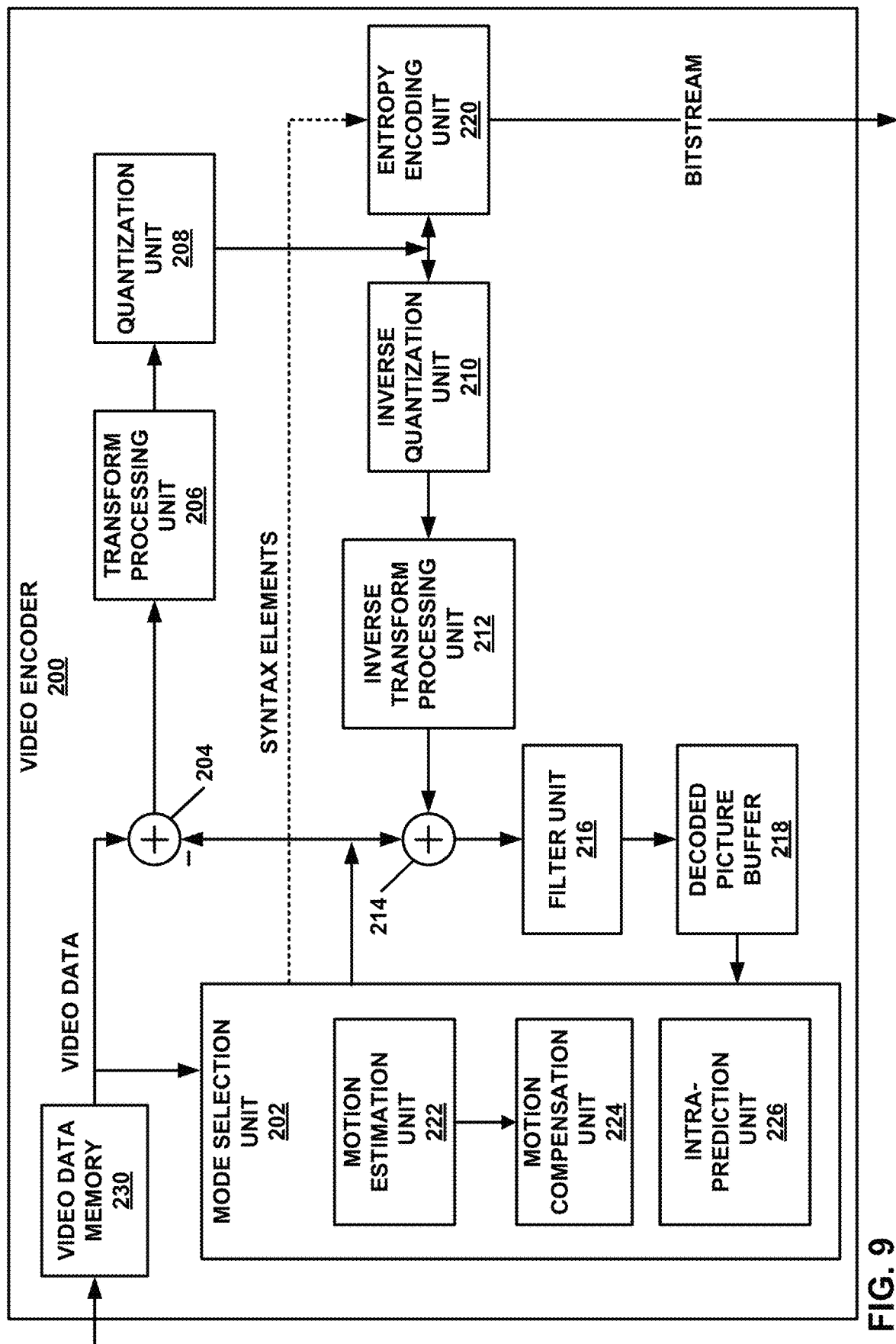
FIG. 9 is a block diagram illustrating an example video encoder that may perform the techniques of this disclosure.

FIG. 9 is a block diagram illustrating an example video encoder 200 that may perform the techniques of this disclosure. FIG. 9 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 9, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1).

DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 9 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors.

Motion compensation unit 224 may be configured to perform any of the various decoder-side motion vector derivation (DMVD) techniques of this disclosure. While referred to as "decoder-side," it should be understood that video encoder 200 may also perform these techniques, such that reference blocks identified by the derived/refined motion vectors are the same. The term "decoder-side" is used because the decoder (e.g., video decoder 300) is able to derive/refine motion vectors for blocks using one or more various techniques without additional information signaled by video encoder 200.

In accordance with techniques of this disclosure, motion compensation unit 224 may code video data using any of the DMVD techniques described above based on a fixed search region in a reference picture. The fixed search region may be an M×N region of any size. A larger M×N fixed search region allows the potential for better compression efficiency at the cost of a requiring a larger on-chip local memory for pre-fetching and storing the reference pixels. A smaller M×N fixed search region allows for the use of smaller on-chip memories, and shorter memory access latency, at the potential cost of compression efficiency. The size of the M×N fixed search region may be selected based on these tradeoffs.

In some examples, the M×N fixed search region is predetermined and is the same for all pictures. In other examples, the M×N fixed search region may be adaptable at the picture or sequence level. In such an example, video encoder 200 may be configured to encode a syntax element that indicates the size of the M×N fixed search region.

Motion compensation unit 224 may then perform any of the various DMVD techniques of this disclosure (or other DMVD-like techniques), performing a refinement search within the fixed search region. Motion compensation unit 224 may perform a motion field reconstruction stage using one or more unrefined motion vectors of previously coded blocks to the current block, then perform a reference sample fetching stage using the one or more unrefined motion vectors to retrieve reference samples within the fixed search region. Motion compensation unit 224 may then perform the DMVD techniques using the retrieved reference samples.

In some examples, when motion compensation unit 224 performs TM, motion compensation unit 224 may use only neighboring reconstruction samples to form a current block template.

Ultimately, after deriving or refining one or more motion vectors using one or more DMVD techniques of this disclosure, motion compensation unit 224 may obtain reference samples to generate a prediction block using the motion vectors. Formation of the prediction block may be performed during a motion compensation stage. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In this manner, video encoder 200 represents an example of a video encoder including a memory configured to store video data; and one or more processors implemented in circuitry and configured to encode a block of video data using a DMVD encoding technique and a fixed search region.

Figure 10:
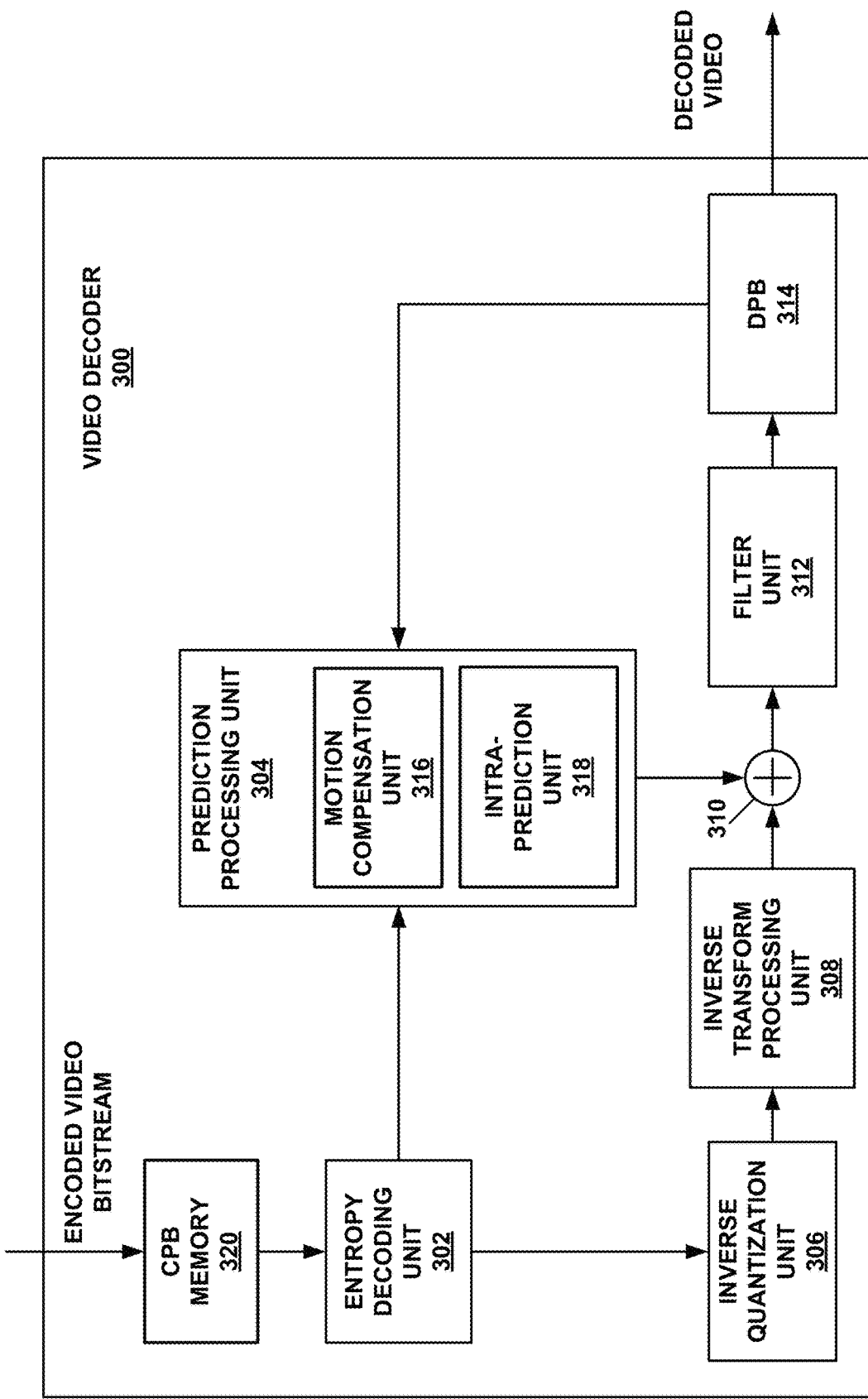
FIG. 10 is a block diagram illustrating an example video decoder that may perform the techniques of this disclosure.

FIG. 10 is a block diagram illustrating an example video decoder 300 that may perform the techniques of this disclosure. FIG. 10 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 10, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 and/or DPB 314 may be on-chip with other components of video decoder 300, or off-chip relative to those components. As will be shown below in FIG. 11, the memory system of video decoder 300 may include both a local memory (e.g., a cache memory that is on-chip relative to the hardware implementation of video decoder 300), as well as an external memory (e.g., DDR RAM) that is accessible by video decoder 300 as well as other processing cores of video encoding and decoding system 100.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 10 are illustrated to assist with understanding the operations performed by video decoder 300. The units may be implemented as fixed-function circuits, programmable circuits, or a combination thereof. Similar to FIG. 9, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 9).

In accordance with techniques of this disclosure, motion compensation unit 316 may determine a fixed search region from which to retrieve reference samples of reference pictures (e.g., stored in DPB 314) for performing DMVD for a current block of video data. The fixed search region may be the same size for any of the various DMVD techniques, e.g., each of template matching (TM), bilateral merge (BM), decoder-side motion vector refinement (DMVR), and/or multi-pass DMVR. While the technique of this disclosure are described in relation to the DMVD techniques described above, the same techniques may be used with any decoding technique that uses a search process and/or uses motion vector information from neighboring blocks. In other examples, a different fixed search region (e.g., M×N search region) may be used for one or more of the DMVD techniques. In one example, video decoder 300 may be preconfigured with the size of the fixed search region for each of the DMVD coding modes. In other examples, video decoder 300 may decode a syntax element that indicates the size of the fixed search region to be used for a picture or a sequence of pictures.

Motion compensation unit 316, or another functional unit of video decoder 300, may be configured to prefetch reference samples for one or more reference pictures in one or more reference picture lists (e.g., list 0 and list 1) based on the size of the fixed search region. As will be shown below, the location of the fixed search region in the reference picture may be determined based on the location of the current block to be coded. In some examples, the fixed search region is centered around the location of the current block. In other examples, the fixed search region may be offset from the location of the current block.

Pre-fetching the reference samples may include accessing the reference samples from in the fixed search region of a reference picture from an external memory (e.g., a RAM), and storing the reference samples in a local memory to video decoder 300 (e.g., a cache memory). In some examples, the local memory may be DPB 314. In other examples, DPB 314 may include both the external memory and the local memory. That is, some decoded pictures being considered as part of DPB 314 may be stored in external memory, while other decoded pictures being considered as part of DPB 314 may be stored in local memory. In the techniques of this disclosure, prefetching reference samples in the fixed search region includes accessing the reference samples from the external memory and storing them in a local memory.

Motion compensation unit 316 may then perform any of the various DMVD techniques of this disclosure (or other DMVD-like techniques), performing a refinement search within the fixed search region using the prefetched reference samples. Motion compensation unit 316 may perform a motion field reconstruction stage using one or more unrefined motion vectors of previously coded blocks to the current block, then perform a reference sample fetching stage using the one or more unrefined motion vectors to retrieve reference samples within the fixed search region. Motion compensation unit 316 may then perform the DMVD techniques using the retrieved reference samples.

In some examples, when motion compensation unit 316 performs TM, motion compensation unit 316 may use only neighboring reconstruction samples to form a current block template.

Ultimately, after deriving or refining one or more motion vectors using one or more DMVD techniques of this disclosure, motion compensation unit 316 may obtain reference samples to generate a prediction block using the motion vectors. Formation of the prediction block may be performed during a motion compensation stage. For example, motion compensation unit 316 may retrieve data of the reference block using the motion vector. As another example, if the motion vector has fractional sample precision, motion compensation unit 316 may interpolate values for the prediction block according to one or more interpolation filters. Moreover, for bi-directional inter-prediction, motion compensation unit 316 may retrieve data for two reference blocks identified by respective motion vectors and combine the retrieved data, e.g., through sample-by-sample averaging or weighted averaging.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 9). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoder including a memory configured to store video data; and one or more processors implemented in circuitry and configured to receive a block of video data that was encoded using a coding mode that includes a search process in one or more reference frames, prefetch reference samples in a fixed search region of at least one reference frame of the one or more reference frames, and decode the block of video data using the coding mode, including performing the search process for the coding mode using the prefetched reference samples.

Figure 11:
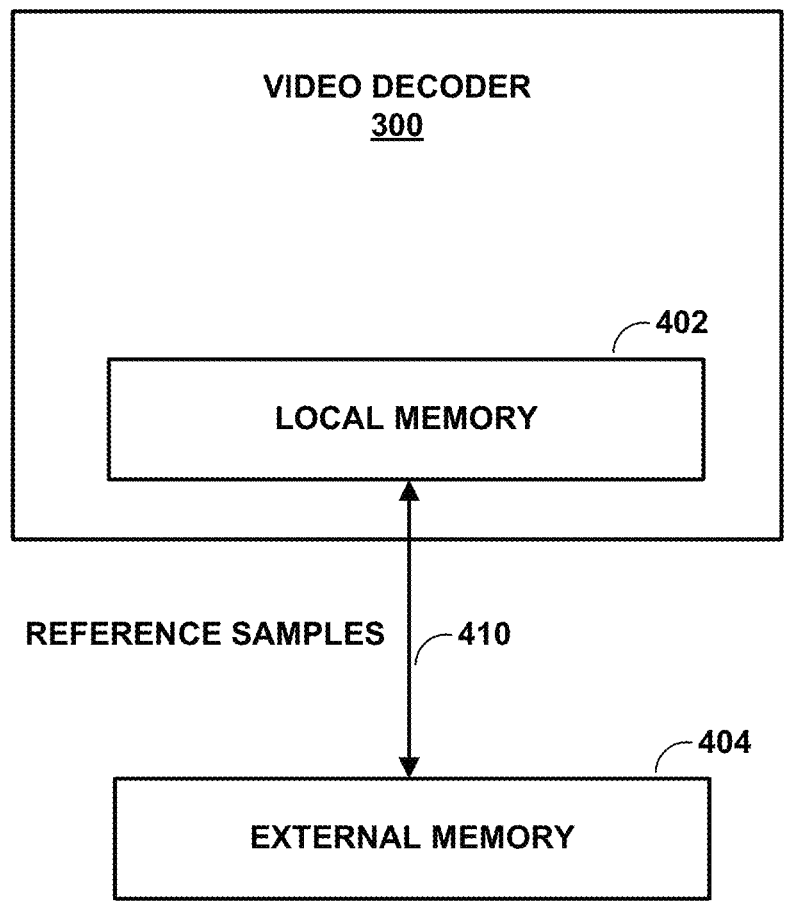
FIG. 11 is a block diagram illustrating an example of pixel prefetching.

FIG. 11 is a block diagram illustrating an example of pixel prefetching. As shown in FIG. 11, video decoder 300 may be configured to prefetch reference samples 410 from external memory 404 and store the prefetched reference samples in local memory 402. External memory 404 may be any type of system memory (e.g., RAM) that may be configured to store large amounts of data. Typically, external memory 404 may be used by processing cores other than video decoder 300 in a processing system. For example, external memory 404 may be accessible by a central processing unit (CPU), a graphics processing unit (GPU), a DSP, or other processing cores. Local memory 402 may be a memory, such a cache, that is only available to video decoder 300. Local memory 402 may typically provide for quicker data access than external memory 420. As discussed above, local memory 402 and external memory 404 may functionally make up DPB 314, even though they are different memory units with different bandwidths and access times.

Video decoder 300 may receive a block of video data that was encoded using a coding mode that includes a search process in one or more reference frames. Examples of such coding may include a template matching (TM) prediction coding mode, a bilateral matching (BM) prediction coding mode, and a decoder-side motion vector refinement (DMVR) coding mode. However, it should be understood that the techniques of this disclosure may be applied with any coding modes that use a search process in a reference picture. In this context, the use of a search process may simply be the use of a motion vector pointing to a location in a reference picture. Restricting the search process to a particular fixed search region in the reference picture may include the disallowance (e.g., at video encoder 200) of the use of motion vectors from a neighboring block that points outside the fixed search region in the reference picture.

Based on the sue of the coding mode that includes a search process in one or more reference frames, video decoder 300 may prefetch reference samples 410 in a fixed search region of at least one reference frame of the one or more reference frames. Video decoder 300 may determine before the coding of pictures, the reference pictures used for decoding the blocks of that picture, and prefetch reference samples in the fixed search region in one or more of such reference pictures prior to decoding the current block of video data. In some examples, video encoder 200 may prefetch reference samples from all reference pictures used to code a current block before decoding the current block. Prefetching reference samples 410 may include fetching the reference samples from external memory 404, and storing the reference samples in local memory 402 as prefetched reference samples. Video decoder 300 may then decode the block of video data using the coding mode, including performing the search process for the coding mode using the prefetched reference samples.

It should be noted that the prefetching of reference samples according to the techniques of this disclosure are applicable for use with coding modes that use integer reference samples as well as fractional reference samples. Since, the reference pixels needed are already fetched locally from external memory, then video decoder 300 may schedule a fractional-pel interpolation process in advance of decoding the block for the corresponding fractional-pel searching. That is, the timing needed for fractional interpolation operations will not further impact the complexity of DMVD operations, such as operations for TM mode. Accordingly, video decoder 300 may further be configured to perform an interpolation process on the prefetched reference samples before decoding the block of video data in situations where the coding mode uses fractional reference pixels.

Figure 12:
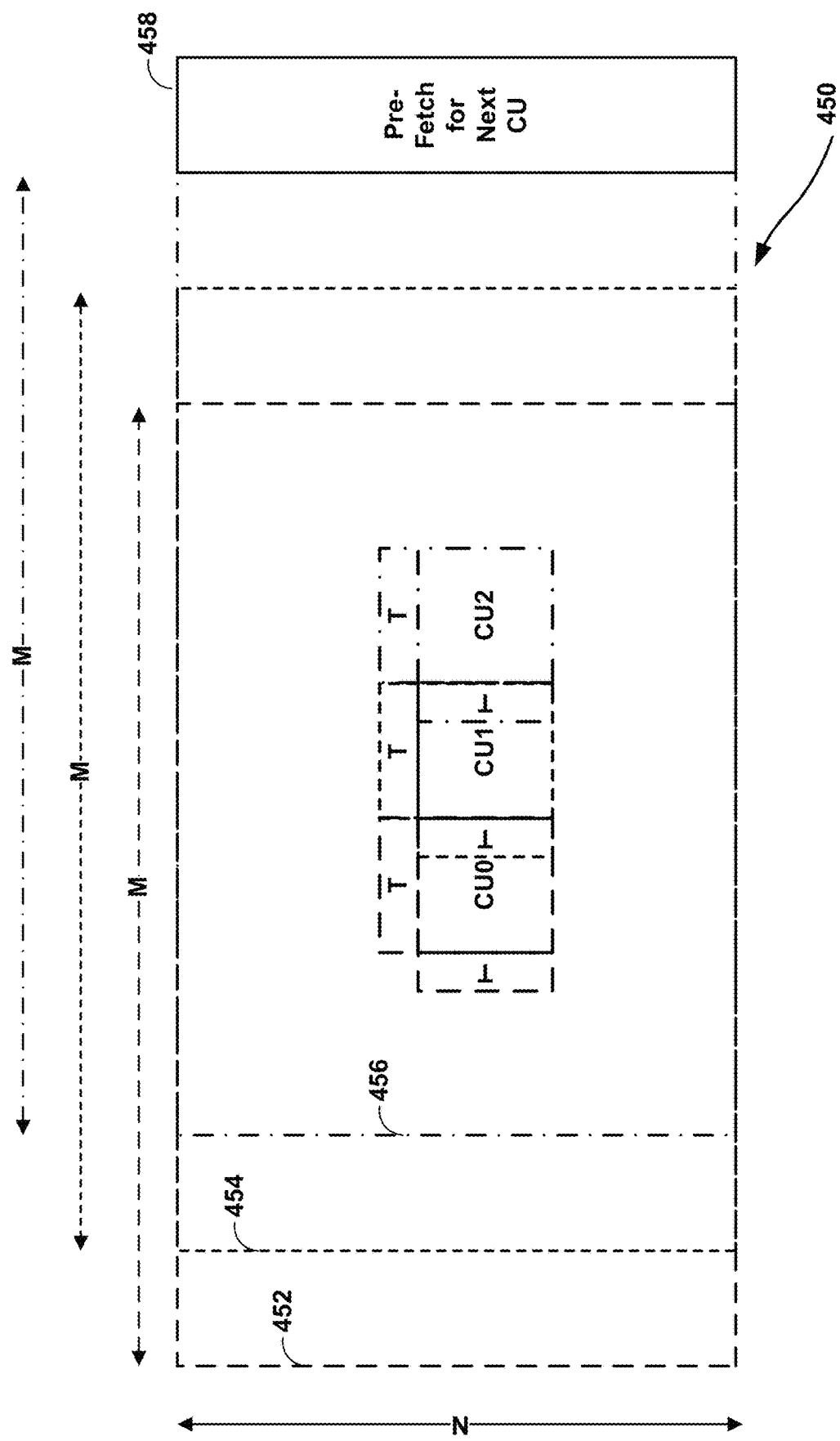
FIG. 12 is a conceptual diagram illustrating example prefetch regions.

FIG. 12 is a conceptual diagram illustrating example prefetch regions. FIG. 12 shows a portion of a reference picture 450. As shown in FIG. 12, video decoder 300 may prefetch reference samples in fixed (M×N) search region 452 for CU0. Similarly, video decoder 300 may prefetch reference samples in fixed (M×N) search region 454 for CU1, and may prefetch reference samples in fixed (M×N) search region 456 for CU2. While this example shows the block of video data being a CU, in other examples, the fixed search regions may be based on other types of blocks, such as coding tree units (CTUs) and/or largest coding units (LCUs).

A shown in FIG. 12, the location of search region 452 for CU0 is generally centered on CU0. That is, the location of search region 452 in the reference picture is based on the location of the block for which the search region is fixed. In other examples, search region 452 may not be centered on CU0, but rather offset from the location of CU0 by a number of samples. Such an offset may be predetermined or signaled by video encoder 200. In general, the location of the fixed search region in the at least one reference frame is based on a position of the block of video data in a current frame.

Furthermore, it should be noted that the fixed search regions substantially overlap for each of the successive CUs CU0, CU1, and CU2 in a row. As such, video decoder 300 need not prefetch all of the search region into local memory, as the majority of such a region may already be in local memory. Instead, after the search region for the first CU is prefetched, the additional prefetch operations for the successive CUs may only need to fetch the next set of reference samples not already in local memory. For example, when prefetching the reference samples in the fixed region for the next CU to the right of CU2, video decoder 300 may only need to prefetch reference samples in region 458 of FIG. 12.

The techniques of this disclosure may provide for the following advantages. Because video encoder 200 and video decoder 300 are configured to use a fixed, co-located search region for DMVD techniques, such as TM, dynamic motion vector information from neighboring blocks of video data need not be decoded to determine what reference samples might be needed. Instead, video decoder 300 may prefetch all reference samples within the fixed search region in a reference picture used for decoding a current block. This eliminates the uncertainty of reference samples fetching, thus improving decoding speed and simplifies decoder hardware implementation. Since fixed search region in the reference picture is known before decoding the current block, the search region of reference pixels can be pre-fetched to the on-chip local storage based on a pre-arranged schedule. In addition, video decoder 300 may interpolate fractional samples in advance for a fractional TM mode (or other mode that uses fractional samples) without further increase to the complexity of TM. Furthermore, the memory bandwidth needed is also pre-determined and the corresponding increase is limited after initial area fetch is fetched per CU/LCU row as described above.

Figure 13:
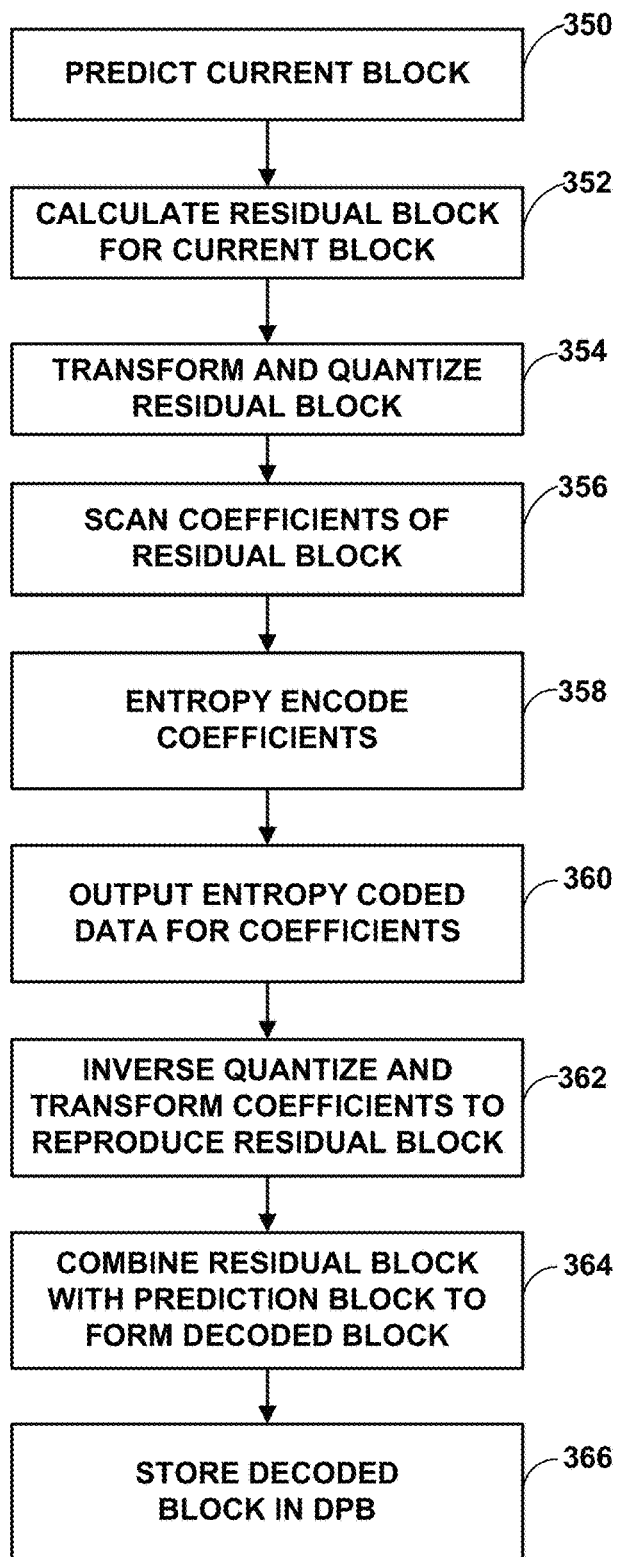
FIG. 13 is a flowchart illustrating an example method for encoding a current block in accordance with the techniques of this disclosure.

FIG. 13 is a flowchart illustrating an example method for encoding a current block in accordance with the techniques of this disclosure. The current block may comprise a current CU. Although described with respect to video encoder 200 (FIGS. 1 and 9), it should be understood that other devices may be configured to perform a method similar to that of FIG. 13.

In this example, video encoder 200 initially predicts the current block (350). For example, video encoder 200 may form a prediction block for the current block. In particular, video encoder 200 may perform inter-prediction to predict the block, including performing decoder-side motion vector derivation (DMVD) according to any of the various techniques of this disclosure, alone or in any combination, to form a motion vector for the current block. Video encoder 200 may then form a prediction block using the motion vector. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 14:
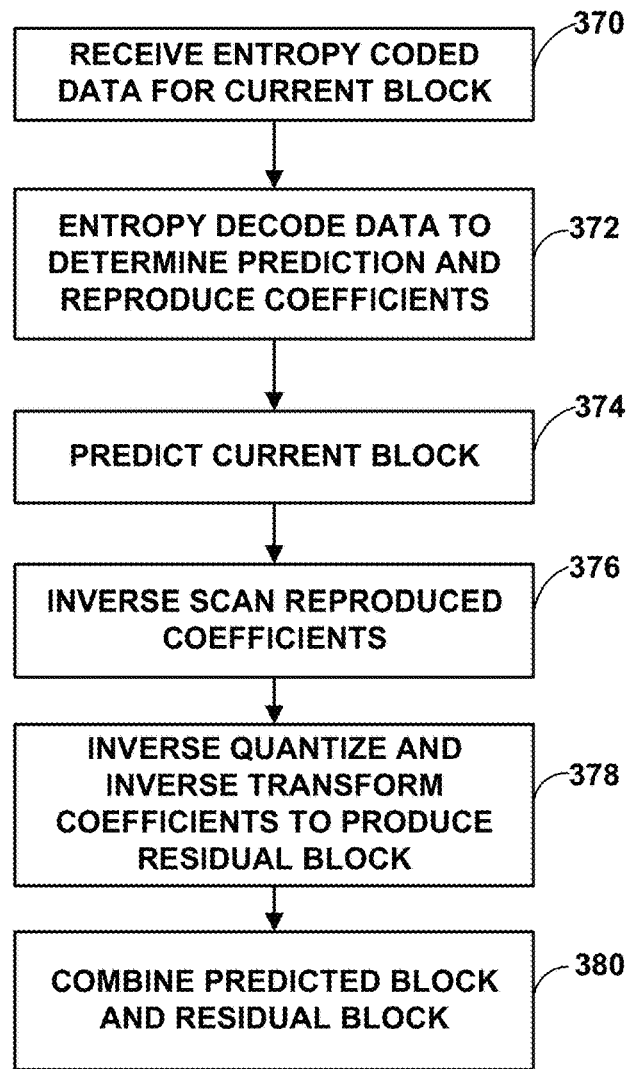
FIG. 14 is a flowchart illustrating an example method for decoding a current block in accordance with the techniques of this disclosure.

FIG. 14 is a flowchart illustrating an example method for decoding a current block of video data in accordance with the techniques of this disclosure. The current block may comprise a current CU. Although described with respect to video decoder 300 (FIGS. 1 and 10), it should be understood that other devices may be configured to perform a method similar to that of FIG. 14.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an inter-prediction mode as indicated by the prediction information for the current block, to calculate a prediction block for the current block. In particular, video decoder 300 may perform inter-prediction to predict the block, including performing decoder-side motion vector derivation (DMVD) according to any of the various techniques of this disclosure, alone or in any combination, to form a motion vector for the current block. Video decoder 300 may then form a prediction block using the motion vector. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 15:
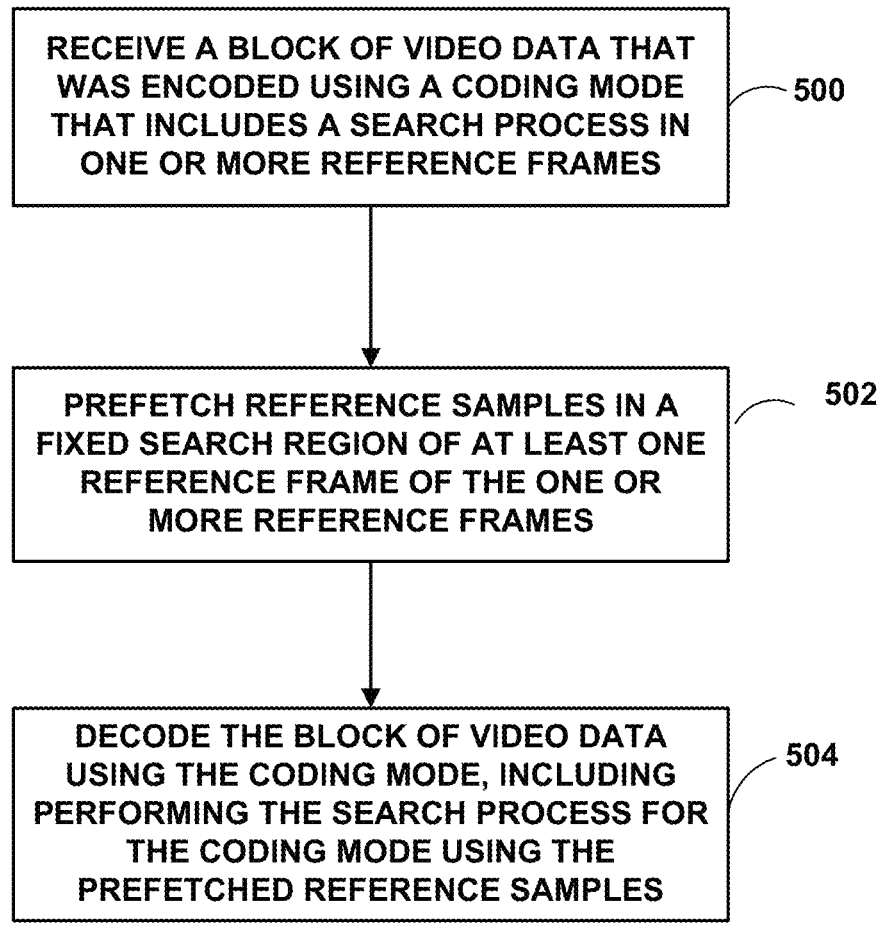
FIG. 15 is a flowchart illustrating another example method for decoding a current block in accordance with the techniques of this disclosure

FIG. 15 is a flowchart illustrating an example method for coding a current block using a motion vector derived and/or refined according to techniques of this disclosure. The method of FIG. 15 may be performed by video decoder 300 (e.g., during step 374 of the method of FIG. 14).

Video decoder 300 may be configured to receive a block of video data that was encoded using a coding mode that includes a search process in one or more reference frames (500). The block of video data may be a coding unit (CU) of video data or a largest coding unit (LCU) of video data. In one example, the coding mode is a template matching (TM) prediction coding mode. In another example, the coding mode is a bilateral matching (BM) prediction coding mode. In another example, the coding mode is a decoder-side motion vector refinement (DMVR) coding mode.

Video decoder 300 may further be configured to prefetch reference samples in a fixed search region of at least one reference frame of the one or more reference frames (502). In one example, to prefetch the reference samples, video decoder 300 is configured to fetch the reference samples from an external memory, and store the reference samples in the local memory as prefetched reference samples. In one example, a size of the fixed search region is preconfigured at video decoder 300. In another example, video decoder 300 may be configured to receive and decode a syntax element that indicates a size of the fixed search region. The location of the fixed search region in the at least one reference frame may be based on a position of the block of video data in a current frame.

Video decoder 300 may be further configured to decode the block of video data using the coding mode, including performing the search process for the coding mode using the prefetched reference samples (504). In some examples, the coding mode uses fractional reference pixels, and video decoder 300 is configured to perform an interpolation process on the prefetched reference samples before decoding the block of video data.

Certain techniques of this disclosure are summarized in the following clauses:

Clause 1. A method of decoding video data, the method comprising: receiving a block of video data that was encoded using a coding mode that includes a search process in one or more reference frames; prefetching reference samples in a fixed search region of at least one reference frame of the one or more reference frames; and decoding the block of video data using the coding mode, including performing the search process for the coding mode using the prefetched reference samples.

Clause 2. The method of Clause 1, wherein prefetching the reference samples comprises: fetching the reference samples from an external memory; and storing the reference samples in a local memory as the prefetched reference samples.

Clause 3. The method of any of Clauses 1-2, wherein the coding mode uses fractional reference pixels, the method further comprising: performing an interpolation process on the prefetched reference samples before decoding the block of video data.

Clause 4. The method of any of Clauses 1-3, wherein the coding mode is a template matching (TM) prediction coding mode.

Clause 5. The method of any of Clauses 1-3, wherein the coding mode is a bilateral matching (BM) prediction coding mode.

Clause 6. The method of any of Clauses 1-3, wherein the coding mode is a decoder-side motion vector refinement (DMVR) coding mode.

Clause 7. The method of any of Clauses 1-6, wherein the block of video data is a coding unit (CU) of video data or a largest coding unit (LCU) of video data.

Clause 8. The method of any of Clauses 1-7, further comprising: receiving a syntax element that indicates a size of the fixed search region.

Clause 9. The method of any of Clauses 1-8, wherein a location of the fixed search region in the at least one reference frame is based on a position of the block of video data in a current frame.

Clause 10. The method of any of Clauses 1-9, further comprising: display a picture that includes the decoded block of video data.

Clause 11. An apparatus configured to decode video data, the apparatus comprising: an external memory; a local memory; and one or more processors in communication with the external memory and the local memory, the one or more processors configured to: receive a block of video data that was encoded using a coding mode that includes a search process in one or more reference frames; prefetch reference samples in a fixed search region of at least one reference frame of the one or more reference frames; and decode the block of video data using the coding mode, including performing the search process for the coding mode using the prefetched reference samples.

Clause 12. The apparatus of Clause 11, wherein to prefetch the reference samples, the one or more processors are further configured to: fetch the reference samples from the external memory; and store the reference samples in the local memory as the prefetched reference samples.

Clause 13. The apparatus of any of Clauses 11-12, wherein the coding mode uses fractional reference pixels, and wherein the one or more processors are further configured to: perform an interpolation process on the prefetched reference samples before decoding the block of video data.

Clause 14. The apparatus of any of Clauses 11-13, wherein the coding mode is a template matching (TM) prediction coding mode.

Clause 15. The apparatus of any of Clauses 11-13, wherein the coding mode is a bilateral matching (BM) prediction coding mode.

Clause 16. The apparatus of any of Clauses 11-13, wherein the coding mode is a decoder-side motion vector refinement (DMVR) coding mode.

Clause 17. The apparatus of any of Clauses 11-16, wherein the block of video data is a coding unit (CU) of video data or a largest coding unit (LCU) of video data.

Clause 18. The apparatus of any of Clauses 11-17, wherein the one or more processors are further configured to: receive a syntax element that indicates a size of the fixed search region.

Clause 19. The apparatus of any of Clauses 11-18, wherein a location of the fixed search region in the at least one reference frame is based on a position of the block of video data in a current frame.

Clause 20. The apparatus of any of Clauses 11-19, further comprising: a display configured to display a picture that includes the decoded block of video data.

Clause 21. An apparatus configured to decode video data, the apparatus comprising: means for receiving a block of video data that was encoded using a coding mode that includes a search process in one or more reference frames; means for prefetching reference samples in a fixed search region of at least one reference frame of the one or more reference frames; and means for decoding the block of video data using the coding mode, including performing the search process for the coding mode using the prefetched reference samples.

Clause 22. The apparatus of Clause 21, wherein the means for prefetching the reference samples comprises: means for fetching the reference samples from an external memory; and means for storing the reference samples in a local memory as the prefetched reference samples.

Clause 23. The apparatus of any of Clauses 21-22, wherein the coding mode uses fractional reference pixels, the apparatus further comprising: means for performing an interpolation process on the prefetched reference samples before decoding the block of video data.

Clause 24. The apparatus of any of Clauses 21-23, wherein the coding mode is one of a template matching (TM) prediction coding mode, a bilateral matching (BM) prediction coding mode, or a decoder-side motion vector refinement (DMVR) coding mode.

Clause 25. The apparatus of any of Clauses 21-24, further comprising: means for receiving a syntax element that indicates a size of the fixed search region.

Clause 26. A non-transitory computer-readable storage medium storing instructions that, when executed, cause one or more processors configured to decode video data to: receive a block of video data that was encoded using a coding mode that includes a search process in one or more reference frames; prefetch reference samples in a fixed search region of at least one reference frame of the one or more reference frames; and decode the block of video data using the coding mode, including performing the search process for the coding mode using the prefetched reference samples.

Clause 27. The non-transitory computer-readable storage medium of Clause 26, wherein to prefetch the reference samples, the instructions further cause the one or more processors to: fetch the reference samples from an external memory; and store the reference samples in a local memory as the prefetched reference samples.

Clause 28. The non-transitory computer-readable storage medium of any of Clauses 26-27, wherein the coding mode uses fractional reference pixels, and wherein the instructions further cause the one or more processors to: perform an interpolation process on the prefetched reference samples before decoding the block of video data.

Clause 29. The non-transitory computer-readable storage medium of any of Clauses 26-28, wherein the coding mode is one of a template matching (TM) prediction coding mode, a bilateral matching (BM) prediction coding mode, or a decoder-side motion vector refinement (DMVR) coding mode.

Clause 30. The non-transitory computer-readable storage medium of any of Clauses 26-29, wherein the instructions further cause the one or more processors to: receive a syntax element that indicates a size of the fixed search region.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving a block of video data that was encoded using a coding mode that includes a search process in one or more reference frames;
prefetching reference samples in a fixed search region of at least one reference frame of the one or more reference frames, wherein prefetching the reference samples comprises:
fetching the reference samples from an external memory; and
storing the reference samples in a local memory as the prefetched reference samples; and
decoding the block of video data using the coding mode, including performing the search process for the coding mode using the prefetched reference samples.

2. The method of claim 1, wherein the coding mode uses fractional reference pixels, the method further comprising:
performing an interpolation process on the prefetched reference samples before decoding the block of video data.

3. The method of claim 1, wherein the coding mode is a template matching (TM) prediction coding mode.

4. The method of claim 1, wherein the coding mode is a bilateral matching (BM) prediction coding mode.

5. The method of claim 1, wherein the coding mode is a decoder-side motion vector refinement (DMVR) coding mode.

6. The method of claim 1, wherein the block of video data is a coding unit (CU) of video data or a largest coding unit (LCU) of video data.

7. The method of claim 1, further comprising:
receiving a syntax element that indicates a size of the fixed search region.

8. The method of claim 1, wherein a location of the fixed search region in the at least one reference frame is based on a position of the block of video data in a current frame.

9. The method of claim 1, further comprising:
display a picture that includes the decoded block of video data.

10. An apparatus configured to decode video data, the apparatus comprising:
an external memory;
a local memory; and
one or more processors in communication with the external memory and the local memory, the one or more processors configured to:
receive a block of video data that was encoded using a coding mode that includes a search process in one or more reference frames;
prefetch reference samples in a fixed search region of at least one reference frame of the one or more reference frames, wherein to prefetch the reference samples, the one or more processors are further configured to:
fetch the reference samples from the external memory; and
store the reference samples in the local memory as the prefetched reference samples; and
decode the block of video data using the coding mode, including performing the search process for the coding mode using the prefetched reference samples.

11. The apparatus of claim 10, wherein the coding mode uses fractional reference pixels, and wherein the one or more processors are further configured to:
perform an interpolation process on the prefetched reference samples before decoding the block of video data.

12. The apparatus of claim 10, wherein the coding mode is a template matching (TM) prediction coding mode.

13. The apparatus of claim 10, wherein the coding mode is a bilateral matching (BM) prediction coding mode.

14. The apparatus of claim 10, wherein the coding mode is a decoder-side motion vector refinement (DMVR) coding mode.

15. The apparatus of claim 10, wherein the block of video data is a coding unit (CU) of video data or a largest coding unit (LCU) of video data.

16. The apparatus of claim 10, wherein the one or more processors are further configured to:
receive a syntax element that indicates a size of the fixed search region.

17. The apparatus of claim 10, wherein a location of the fixed search region in the at least one reference frame is based on a position of the block of video data in a current frame.

18. The apparatus of claim 10, further comprising:
a display configured to display a picture that includes the decoded block of video data.

19. An apparatus configured to decode video data, the apparatus comprising:
means for receiving a block of video data that was encoded using a coding mode that includes a search process in one or more reference frames;
means for prefetching reference samples in a fixed search region of at least one reference frame of the one or more reference frames, wherein the means for prefetching the reference samples comprises:
means for fetching the reference samples from an external memory; and
means for storing the reference samples in a local memory as the prefetched reference samples; and
means for decoding the block of video data using the coding mode, including means for performing the search process for the coding mode using the prefetched reference samples.

20. The apparatus of claim 19, wherein the coding mode uses fractional reference pixels, the apparatus further comprising:
means for performing an interpolation process on the prefetched reference samples before decoding the block of video data.

21. The apparatus of claim 19, wherein the coding mode is one of a template matching (TM) prediction coding mode, a bilateral matching (BM) prediction coding mode, or a decoder-side motion vector refinement (DMVR) coding mode.

22. The apparatus of claim 19, further comprising:
means for receiving a syntax element that indicates a size of the fixed search region.

23. A non-transitory computer-readable storage medium storing instructions that, when executed, cause one or more processors configured to decode video data to:
receive a block of video data that was encoded using a coding mode that includes a search process in one or more reference frames;
prefetch reference samples in a fixed search region of at least one reference frame of the one or more reference frames, wherein to prefetch the reference samples, the instructions further cause the one or more processors to:
fetch the reference samples from an external memory; and
store the reference samples in a local memory as the prefetched reference samples; and
decode the block of video data using the coding mode, including performing the search process for the coding mode using the prefetched reference samples.

24. The non-transitory computer-readable storage medium of claim 23, wherein the coding mode uses fractional reference pixels, and wherein the instructions further cause the one or more processors to:
perform an interpolation process on the prefetched reference samples before decoding the block of video data.

25. The non-transitory computer-readable storage medium of claim 23, wherein the coding mode is one of a template matching (TM) prediction coding mode, a bilateral matching (BM) prediction coding mode, or a decoder-side motion vector refinement (DMVR) coding mode.

26. The non-transitory computer-readable storage medium of claim 23, wherein the instructions further cause the one or more processors to:
receive a syntax element that indicates a size of the fixed search region.

* * * * *